US012688871B2

(12) United States Patent
Liu et al.

(10) Patent No.: US 12,688,871 B2
(45) Date of Patent: Jul. 21, 2026

(54) USE OF COMMON HEAD SLIDER FOR DIFFERENT RPM HARD DISK DRIVES

(71) Applicant: Western Digital Technologies, Inc., San Jose, CA (US)

(72) Inventors: Yanning Liu, San Jose, CA (US); Biao Sun, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 59 days.

(21) Appl. No.: 18/226,217

(22) Filed: Jul. 25, 2023

(65) Prior Publication Data

US 2024/0371403 A1 Nov. 7, 2024

Related U.S. Application Data

(60) Provisional application No. 63/463,461, filed on May 2, 2023.

(51) Int. Cl.
G11B 5/60 (2006.01)
G11B 5/48 (2006.01)
(52) U.S. Cl.
CPC .......... G11B 5/6064 (2013.01); G11B 5/4826 (2013.01)
(58) Field of Classification Search
None
See application file for complete search history.

(56) References Cited

U.S. PATENT DOCUMENTS

| | | | |
|---|---|---|---|
| 5,666,237 A | 9/1997 | Lewis | |
| 6,104,566 A * | 8/2000 | Stephenson | G11B 19/28 360/73.03 |
| 6,144,178 A | 11/2000 | Hirano et al. | |
| 7,068,456 B2 * | 6/2006 | Walz | G11B 33/12 |
| 7,123,449 B2 | 10/2006 | Kang | |
| 7,706,095 B2 | 4/2010 | Boutaghou et al. | |
| 7,774,545 B2 * | 8/2010 | Delaney | G06F 3/0664 711/114 |

(Continued)

OTHER PUBLICATIONS

Yang, Jiaping et al., Thermal analysis of helium-filled enterprise disk drive, Microsystem Technologies, Oct. 2010, Microsyst Technol (2010) 16:1699-1704, Received: Aug. 20, 2009 / Accepted: Jul. 22, 2010 / Published online: Aug. 4, 2010, Springer-Verlag.

*Primary Examiner* — Fred Tzeng
(74) *Attorney, Agent, or Firm* — John D. Henkhaus

(57) ABSTRACT

A method of manufacturing hard disk drives (HDDs) includes assembling a first HDD including a first slider having a first air bearing surface (ABS) configuration, configuring the first HDD to rotate its disk media at a first revolutions-per-minute (RPM), and sealing the first HDD with a first internal pressure level. Continuing, the method includes assembling a second HDD including a second head slider having the same first ABS configuration, configuring the second HDD to rotate its disk media at a second RPM that is lower than the first RPM, and sealing the second HDD with a second internal pressure level that is higher than the first pressure level. Thus, in the context of using a common slider among different RPM drives, a higher internal pressure for the lower RPM drive can compensate for loss in fly height that might otherwise occur due to the lower operational RPM.

20 Claims, 5 Drawing Sheets

(56)  References Cited

U.S. PATENT DOCUMENTS

| 8,098,450 | B2 * | 1/2012 | Baumgart | ............ | G11B 5/6005 |
| | | | | | 360/75 |
| 8,743,502 | B1 * | 6/2014 | Bonke | .................... | G11B 19/28 |
| | | | | | 360/73.03 |
| 9,286,932 | B2 * | 3/2016 | Anderson | .............. | G11B 19/26 |
| 11,355,143 | B2 | 6/2022 | Lu et al. | | |
| 2005/0105216 | A1 * | 5/2005 | Ueno | ................... | G11B 5/6082 |
| | | | | | 360/235.8 |
| 2005/0144491 | A1 * | 6/2005 | Zayas | .................. | G11B 5/5565 |
| 2005/0207065 | A1 * | 9/2005 | Takagi | ................ | G11B 5/6082 |
| | | | | | 360/235.8 |
| 2006/0212779 | A1 * | 9/2006 | Chang | .................... | G11B 19/04 |
| | | | | | 714/767 |
| 2006/0218416 | A1 * | 9/2006 | Gururangan | .......... | G06F 1/3203 |
| | | | | | 713/300 |
| 2007/0070539 | A1 * | 3/2007 | Lee | ........................ | G11B 19/28 |
| | | | | | 360/73.03 |
| 2007/0103816 | A1 * | 5/2007 | Nakakita | ................ | G11B 21/21 |
| 2007/0171563 | A1 * | 7/2007 | Pit | ........................ | G11B 5/6052 |
| 2010/0033866 | A1 * | 2/2010 | Boutaghou | .......... | G11B 5/6064 |
| | | | | | 360/75 |
| 2012/0023289 | A1 * | 1/2012 | Anderson | ............ | G11B 19/209 |
| | | | | | 711/E12.001 |

* cited by examiner

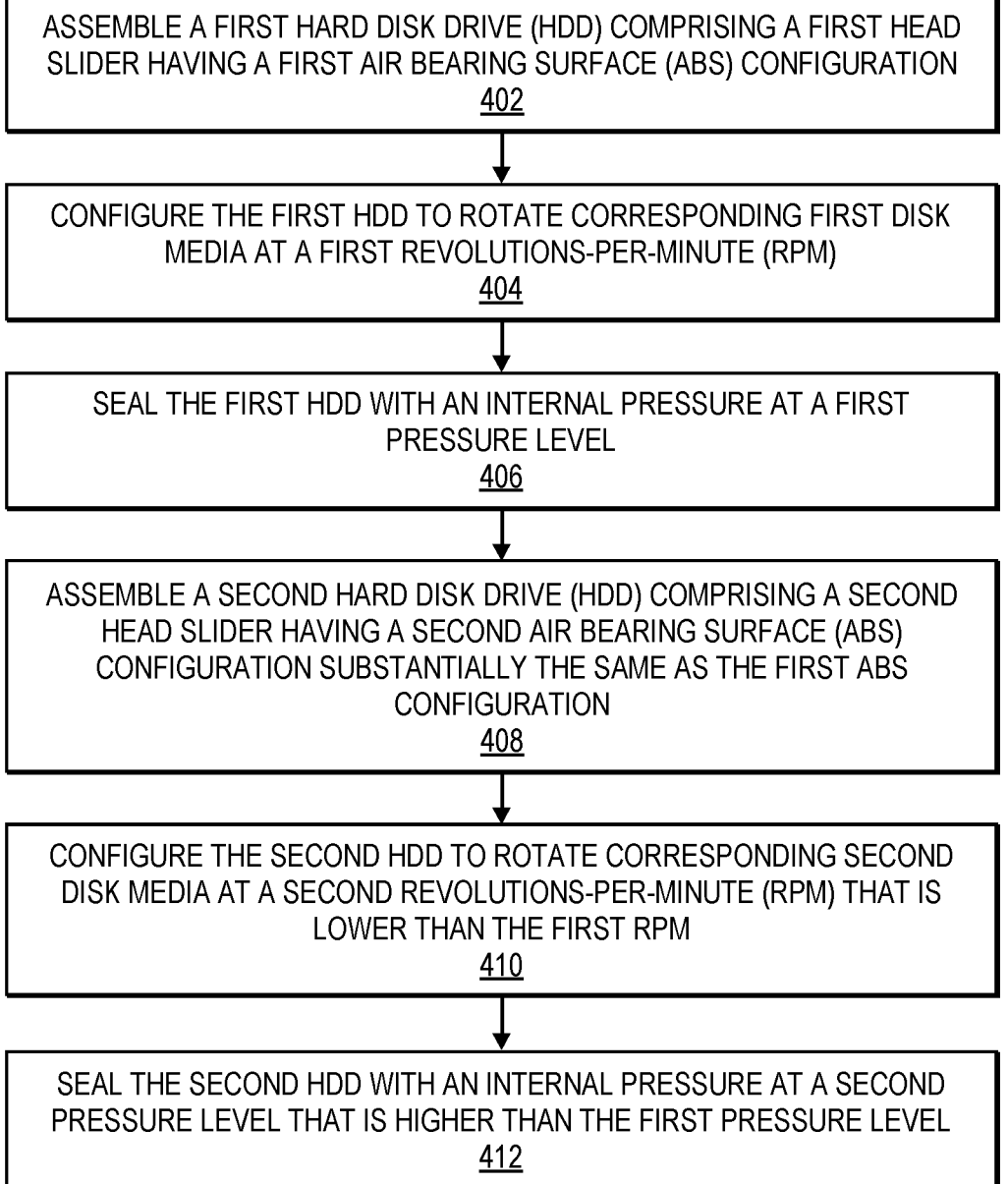

ASSEMBLE A FIRST HARD DISK DRIVE (HDD) COMPRISING A FIRST HEAD SLIDER HAVING A FIRST AIR BEARING SURFACE (ABS) CONFIGURATION
402

CONFIGURE THE FIRST HDD TO ROTATE CORRESPONDING FIRST DISK MEDIA AT A FIRST REVOLUTIONS-PER-MINUTE (RPM)
404

SEAL THE FIRST HDD WITH AN INTERNAL PRESSURE AT A FIRST PRESSURE LEVEL
406

ASSEMBLE A SECOND HARD DISK DRIVE (HDD) COMPRISING A SECOND HEAD SLIDER HAVING A SECOND AIR BEARING SURFACE (ABS) CONFIGURATION SUBSTANTIALLY THE SAME AS THE FIRST ABS CONFIGURATION
408

CONFIGURE THE SECOND HDD TO ROTATE CORRESPONDING SECOND DISK MEDIA AT A SECOND REVOLUTIONS-PER-MINUTE (RPM) THAT IS LOWER THAN THE FIRST RPM
410

SEAL THE SECOND HDD WITH AN INTERNAL PRESSURE AT A SECOND PRESSURE LEVEL THAT IS HIGHER THAN THE FIRST PRESSURE LEVEL
412

FIG. 4

USE OF COMMON HEAD SLIDER FOR DIFFERENT RPM HARD DISK DRIVES

FIELD OF EMBODIMENTS

Embodiments of the invention may relate generally to data storage devices and particularly to approaches to incorporating a common head slider in different operating RPM (revolutions per minute) hard disk drives.

BACKGROUND

A hard disk drive (HDD) is an electronic non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, because the density of helium is one-seventh that of air. For example, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDDs is also increased due to low humidity, less sensitivity to altitude and external pressure variations, and the absence of corrosive gases or contaminants.

While there may be exceptions, a typical HDD (or "drive") is designed and configured to operate at one particular RPM (revolutions per minute), which refers to the rotational speed of the spindle on which the recording disks are mounted. Generally and broadly, HDDs have been known to be designed to operate in a range of 1200-15,000 RPM. Given two identically designed HDDs having the same areal density, a 7200 RPM drive can access data about 33% faster than a 5400 RPM drive. However, a lower RPM drive will have lower power consumption resulting in a lower (better) operational cost. Additionally, better ADC (analog-to-digital conversion) with lower RPM drives can also boost total drive capacity. Thus, lower RPM drives are known to offer an overall lower $/TB (cost/unit of data storage).

Any approaches that may be described in this section are approaches that could be pursued, but not necessarily approaches that have been previously conceived or pursued.

Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 4 is a flow diagram illustrating a method of manufacturing a plurality of hard disk drives, according to an embodiment.

DETAILED DESCRIPTION

Generally, approaches to implementing a common head slider in different RPM hard disk drives are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, may not be absolutely leak-free.

Context

Recall that HDDs are being manufactured which are hermetically sealed with helium inside, with various benefits resulting therefrom. One approach to manufacturing a hermetically-sealed HDD involves sealing a cover (typically a "second" cover, over a "first" cover) to an HDD enclosure base using laser welding, for example, after various functional tests are completed.

Figure 2:
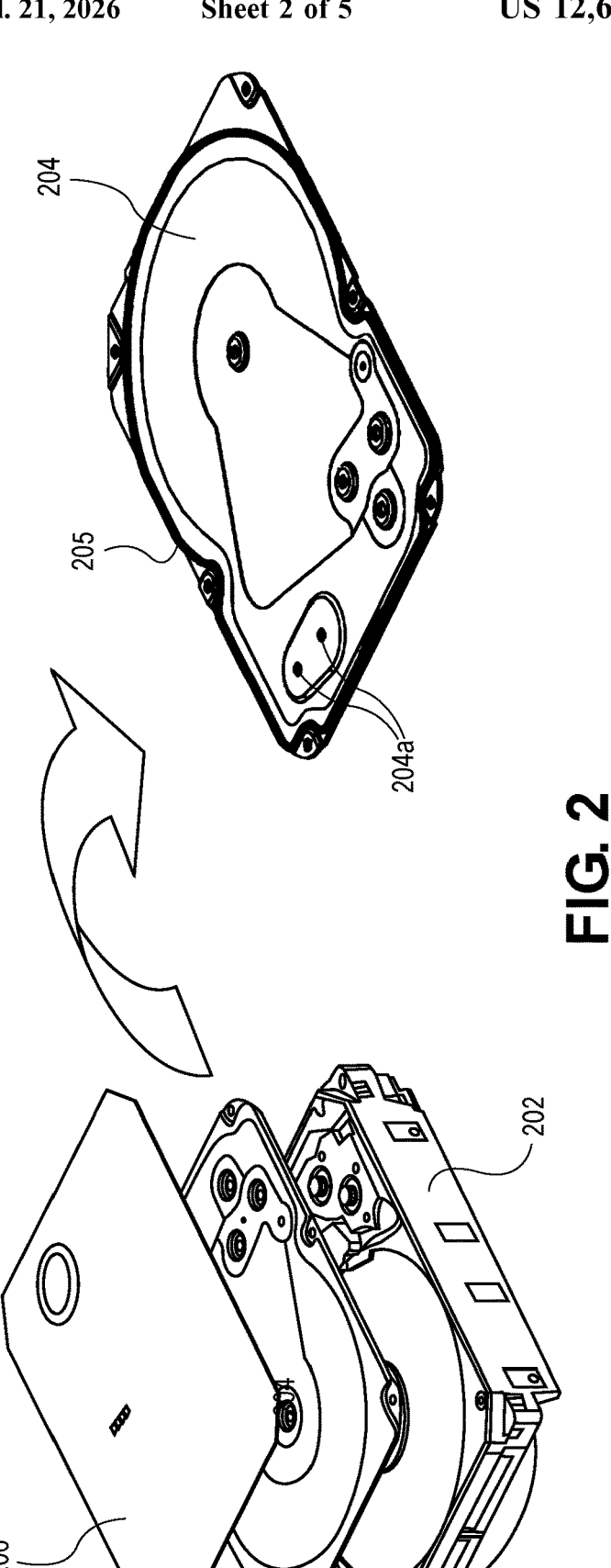
FIG. 2 is an exploded view illustrating a hermetically-sealed HDD, according to an embodiment.

FIG. 2 is an exploded view illustrating a hermetically-sealed HDD, according to an embodiment. Hermetically-sealed hard disk drive (HDD) 200 comprises an enclosure base 202 (or simply "base 202"), a first cover 204 ("inner cover 204") affixed to the base 202, and a second cover 206 ("outer cover 206") over the inner cover 204 and hermetically coupled (e.g., welded) to the base 202. The right side of FIG. 2 illustrates the inner cover 204 turned upside down, i.e., illustrating the inside of the inner cover 204 and shown comprising a gasket seal 205 such as a formed-in-place gasket (FIPG) seal applied to the inside of the inner cover 204.

According to an embodiment, inner cover 204 further comprises ports 204a through the inner cover 204. Ports 204a are typically associated with a coincident internal breather filter (not shown here), such as a sorbent breather filter (or "absorbent/adsorbent breather filter" or "adsorbent breather filter" or "AB filter"), which typically comprises a container enclosing one or more compartments for housing respective adsorbents and/or absorbents. Generally, such an AB filter is positioned internally over the ports 204a of the inner cover 204 and configured to receive input gas(es) from an external environment (e.g., the environment external to the HDD) and to pass output gas from the internal environment (e.g., the environment internal to the HDD) to the external environment. For example, in the context of a hermetically-sealed HDD, the AB filter can function to filter gases injected through one or more of the ports 204a into the HDD 200 during manufacturing processes, such as the dry air injected into an HDD during the humidity control process and/or the lighter-than-air gas (e.g., helium) injected into an HDD during the gas injection process.

Typically, immediately after injection of the lighter-than-air gas into HDD 200, thereby attaining a certain desired internal pressure of the gas within the HDD 200, a quick "temporary" seal (such as a metalized tape, for a non-limiting example) may be applied over the ports 204a so that subsequent manufacturing testing may be completed prior to long-term hermetically sealing. Once testing is completed, HDD 200 may be reinjected with additional gas if necessary to attain the desired internal pressure, and ultimately the outer cover 206 is hermetically sealed to the base 202 such as by laser welding.

Figure 3:
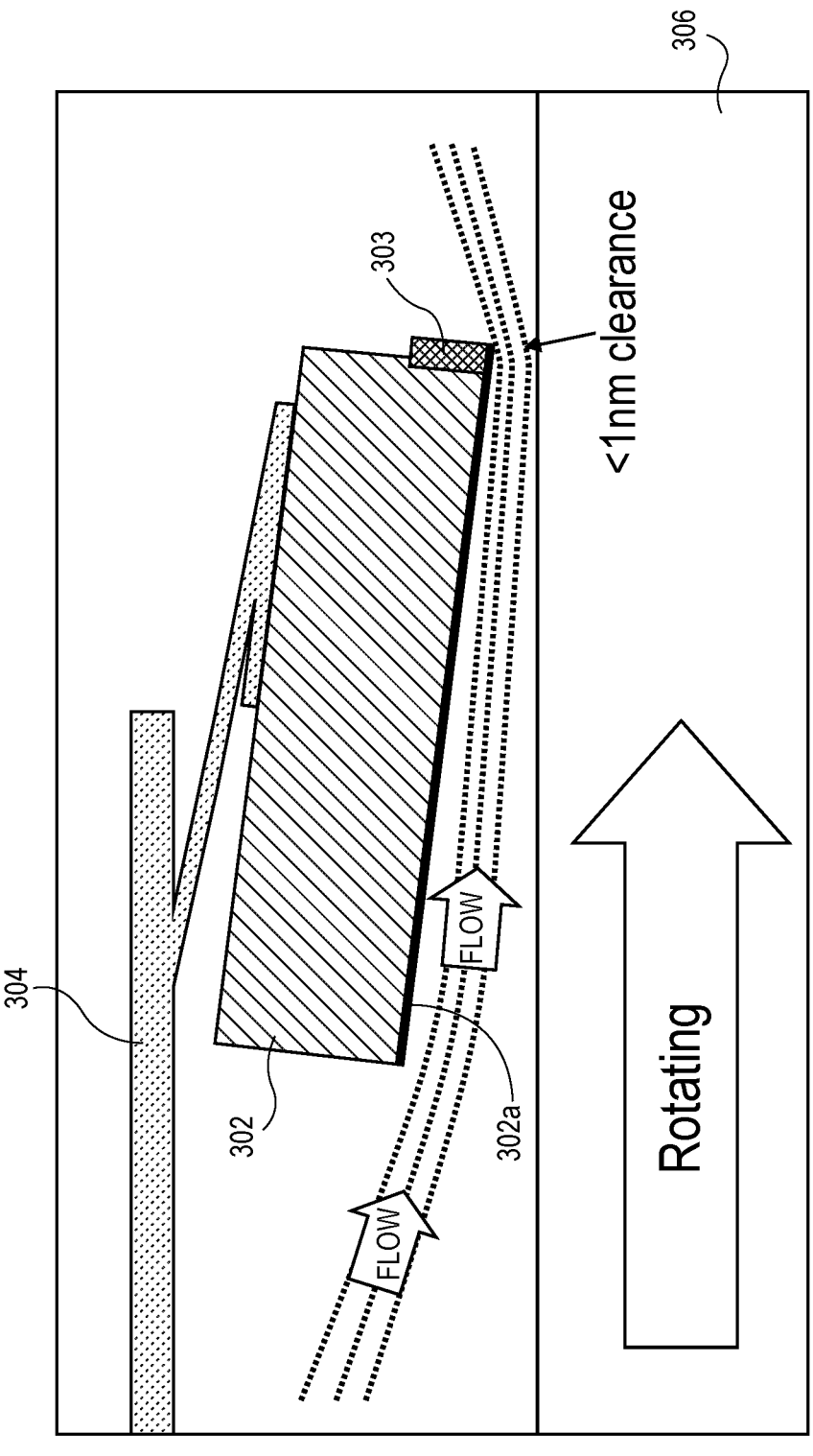
FIG. 3 is a side view diagram illustrating a head-disk interface (HDI), according to an embodiment.

FIG. 3 is a side view diagram illustrating a head-disk interface (HDI), according to an embodiment. FIG. 3 illustrates a head slider 302 comprising a read-write transducer 303 (or "element 303" or "head 303"), flexibly coupled (e.g., via a flexure) with a suspension assembly 304, flying over the surface of a disk 306 rotating at a certain RPM. Rotation of disk 306 (the direction of which is depicted with the larger block arrow) generates gaseous flow (the direction of which is depicted with the smaller block arrows) which causes the slider 302 to remain airborne or "fly" over, and at a very small distance from (e.g., <1 nanometer), the disk 306. In the HDI, the flow of gas generated by the moving disk 306 and compressed by an ABS 302a of the slider 302 creates pressure that balances the suspension load on the slider 302, and serves as a cushion to stabilize the motion of the slider 302 and to inhibit contact between slider 302 and disk 306. The precise manner in which slider 302 flies over disk 306, including maintaining a stable flying height (or "fly height", i.e., the distance between the slider and the spinning disk when the slider flies over the surface of the disk), is highly dependent on the configuration of the pre-patterned topography of the air bearing surface 302a ("ABS 302a") of the slider 302 which is fabricated on the surface of the slider 302 facing disk 306.

Recall also that there are operational cost benefits to operating lower RPM HDDs (e.g., a 5400 RPM drive), in comparison to higher RPM HDDs (e.g., a 7200 RPM drive). However, one challenge that presents with lower RPM so-called "sealed" drives (e.g., hermetically sealed with helium inside) involves operational and, therefore, design complexity. The fundamental physics dictates that the slider (and thus the read-write head) will fly lower in a lower RPM environment than in a higher RPM environment, in scenarios in which a common ABS is used among differing RPM drives. Hence, for a lower RPM drive, a different slider ABS would be needed to suitably fly the slider at the lower RPM. Consequently, different wafer back-end processes would be needed for 5400 RPM versus 7200 RPM drives, which increases HGA (head-gimbal assembly) cost due to manufacturing complexity. Attempts to design an air bearing surface that could work in both 7200 RPM and 5400 RPM drives has proved challenging due to excessive performance compromise.

Hermetically-Sealed Hard Disk Drive Internal Pressure Compensation for Common Slider Scenarios Among Different RPM Drives Considering the context of a sealed helium (or other lighter-than-air gas) HDD, there is another parameter to adjust the slider fly height and that is the internal drive pressure. According to an embodiment, the internal gas pressure level of a sealed lower RPM drive is increased, i.e., to increase or maintain a suitable slider 302/head 303 fly height. That is, a suitably higher internal pressure level can compensate for any loss in fly height that might otherwise occur, with the use of a common ABS among different RPM drives (i.e., with the common ABS designed/optimized for the higher RPM drive), due to a lower operational RPM. Similarly and according to an embodiment, the internal gas pressure of a sealed higher RPM drive may be reduced, i.e., to decrease or maintain a suitable slider 302/head 303 fly height (i.e., with the common ABS designed/optimized for the lower RPM drive). As such, reducing the internal pressure of the higher RPM drive may be implemented in conjunction with increasing the internal pressure of the lower RPM drive, or may be implemented independently.

Method of Manufacturing a Plurality of Hard Disk Drives

FIG. 4 is a flow diagram illustrating a method of manufacturing a plurality of hard disk drives, according to an embodiment. The method of FIG. 4 may be used to manufacture hermetically-sealed HDDs, such as generally illustrated and described herein in reference to FIG. 2, and equivalents and variants thereof.

At block 402, assemble a first hard disk drive (HDD) comprising a first head slider having a first air bearing surface (ABS) configuration. For example, assemble a hermetically-sealed HDD such as HDD 200 (FIG. 2), which includes a particular first slider design having a particular first ABS configuration (see, e.g., slider 110*b* including magnetic read-write head 110*a* of FIG. 1, and, e.g., slider 302 that includes read-write head 303 and ABS 302*a* of FIG. 3).

At block 404, configure the first HDD to rotate corresponding first disk media at a first revolutions-per-minute (RPM). For a non-limiting example, a disk spindle motor (see, e.g., spindle 124 of FIG. 1) and drive electronics (see, e.g., various electronics described in reference to FIG. 1), etc. may be configured to perform data operations (e.g., I/O, or input/output) at 7200 RPM. Furthermore, the first slider and corresponding first ABS may likewise be designed and optimized for an HDD configured to operate at 7200 RPM. Note here that blocks 402 and 404, which are referenced here for conceptual purposes, are not necessarily performed as discrete steps or actions in that order. That is, the various components of an HDD may be designed, optimized, configured to operate at a particular disk RPM, prior to their assembly into a final HDD product.

At block 406, seal the first HDD with an internal pressure at a first pressure level. For example, the first HDD is configured (e.g., injected or otherwise filled with a lighter-than-air gas, such as helium for a non-limiting example, to attain a particular desired pressure level) and then sealed such that the desired pressure level (for a non-limiting example, 0.66 atmosphere (atm)) is maintained therein, e.g., according to known techniques generally referred to herein. According to an embodiment, sealing the first HDD at a first internal pressure level includes hermetically sealing the first HDD, so as to maintain nominally no or negligible gaseous (e.g., helium) leakage or permeation paths.

At block 408, assemble a second hard disk drive (HDD) comprising a second head slider having a second air bearing surface (ABS) configuration substantially the same as the first ABS configuration. For example, assemble a hermetically-sealed HDD such as HDD 200 (FIG. 2), which includes a particular second slider design having a particular second ABS configuration (see, e.g., slider 110*b* including magnetic read-write head 110*a* of FIG. 1, and, e.g., slider 302 that includes read-write head 303 and ABS 302*a* of FIG. 3), where the first and second ABS configurations are the same. To that end, according to an embodiment each of the first and second head sliders is formed, fabricated according to the same slider manufacturing or fabrication process(es), thus yielding substantially same slider units.

At block 410, configure the second HDD to rotate corresponding second disk media at a second RPM that is lower than the first RPM. For a non-limiting example, a disk spindle motor, drive electronics, etc. may be configured to perform data operations at 5400 RPM. Here however, rather than designing and optimizing the second slider to operate in a 5400 RPM drive, the second slider and corresponding second ABS are the same as the first slider and corresponding first ABS, e.g., designed and optimized for an HDD configured to operate at 7200 RPM. Note here also that blocks 408 and 410, which are referenced here for conceptual purposes, are not necessarily performed as discrete steps or actions in that order. That is, the various components of an HDD may be designed, optimized, configured to operate at a particular disk RPM, prior to their assembly into a final HDD product.

At block 412, seal the second HDD with an internal pressure at a second pressure level that is higher than the first pressure level. For example, the second HDD is configured (e.g., injected or otherwise filled with a lighter-than-air gas, such as the same as or a different gas from the first lighter-than-air gas of the first HDD, to attain a particular desired pressure level) and sealed such that the desired pressure level is maintained therein, e.g., according to known techniques generally referred to herein. Here also, and according to an embodiment, sealing the second HDD at a second internal pressure level includes hermetically sealing the second HDD, so as to maintain nominally no or negligible gaseous (e.g., helium) leakage or permeation paths.

In light of the foregoing manufacturing method, a higher internal pressure for a lower RPM drive, utilizing a common slider and ABS designed and configured for a higher RPM drive having a relatively lower internal pressure, contributes to mitigating or compensating for any loss in fly height that might otherwise occur with the use of such a common slider among different RPM drives. Similarly and according to an embodiment, the internal pressure of a sealed higher RPM drive (e.g., 7200 RPM) may be reduced to decrease or maintain a suitable slider fly height, in a scenario in which the common ABS is designed/optimized for the lower RPM drive (e.g., 5400 RPM). Thus, with incorporation of a commonly fabricated slider/ABS into hermetically-sealed HDDs operating at different RPMs, the specific RPMs and corresponding pressure levels may vary from implementation to implementation while being designed for accordingly.

According to an embodiment, each of the first and second HDDs is configured to operate (e.g., at blocks 404 and 410, respectively) only at a respective single operating RPM for data I/O purposes. Stated otherwise, in this embodiment the first and second HDDs are not intended as HDDs that are specifically designed and configured to operate at multiple different and discrete RPMs, such as while compensating for the multiple RPMs within a given drive. The RPM differential provided by that approach is considered limited with consequent limited value to the user, and too detrimental to drive performance due to the "mothership" fly height (e.g., baseline fly height without active compensation) being so disparate between such different RPMs (e.g., 7200 vs. 5400). Here, the mothership fly height difference between the different RPM drives is compensated for by filling the different drives to different internal pressures, while utilizing the same drive components (e.g., mechanical and electronics) in both drives, according to an embodiment.

In addition to incorporating the same components within each different RPM drive, for manufacturing efficiency, in the context of the lower RPM drive such drive may be preliminarily manufactured at the higher RPM and with the lower internal pressure to save manufacturing time. That is, both the first and second drives in the method of FIG. 4 may be manufactured according to the same manufacturing processes (or in the same "manufacturing line") and using the same constituent components or parts (i.e., parts fabricated according to the same part designs). This would reduce production cost and increase manufacturing throughput. Ultimately, such drive would be refilled to the higher pressure level before the second cover is sealed, with minimum re-configurations applied for lower RPM operation before shipping.

Figure 5:
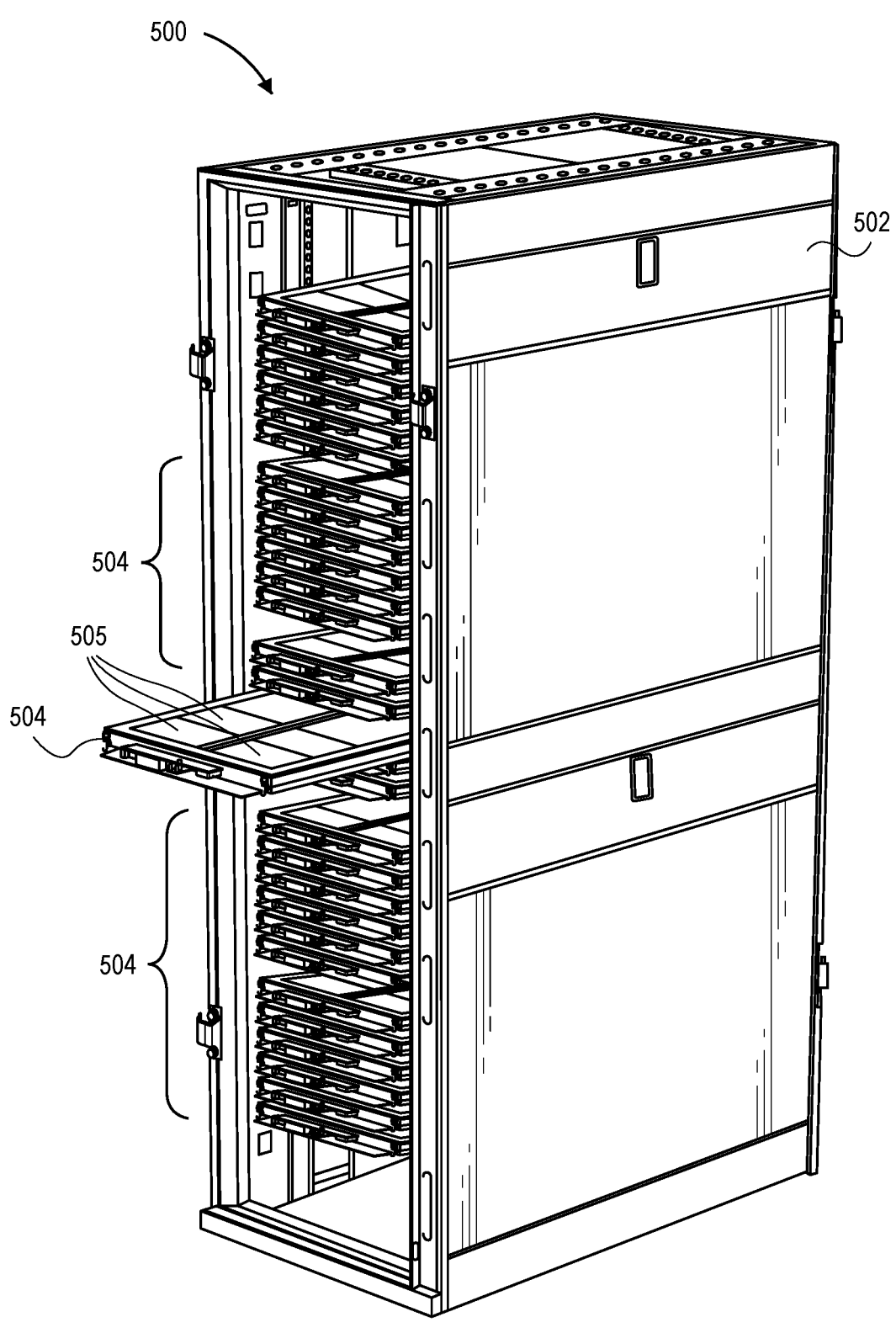
FIG. 5 is a perspective view illustrating an example data storage system, according to an embodiment.

Physical Description of an Illustrative Operating Context- Data Storage System There is a commercial demand for high-capacity digital data storage systems, in which multiple data storage devices (DSDs), such as hard disk drives (HDDs), solid-state (e.g., flash memory based) drives (SSDs), tape drives, hybrid drives, and the like are housed in a common enclosure. Data storage systems often include large enclosures that house multiple shelves on which rows of DSDs are mounted. FIG. 5 is a perspective view illustrating an example data storage system, according to an embodiment. A data storage system (DSS) 500 may comprise a system enclosure 502 (or "rack 502"), in which multiple data storage system trays 504 (or otherwise grouped) are housed. Each tray 504 may be placed or slid onto a corresponding shelf or rail within the rack 502, for example. Each tray 504 is composed of multiple slots, compartments, mounting spaces in which a respective DSD 505 is housed and communicatively coupled with a system controller, such as via a backplane or otherwise. Typically, a rack 502 further houses such a system controller, and may further house switches, storage server(s), application server(s), a power supply, cooling fans, etc. While each tray 504 and constituent DSDs 505 in this example are illustrated as positioned horizontally within the rack 502, DSD trays 504 alternatively may be positioned vertically or otherwise within a comparable rack.

Generally, a data center (or, more generally, "mass storage system") may be likened to an extreme version of a data storage system (or multiple data storage systems working together), along with the power, cooling, space, and the like, needed to operate the storage, management, and sharing of data as well as the corresponding network infrastructure (e.g., routers, switches, firewalls, application-delivery controllers, and the like). Expanding on that notion, a "hyper-scale" data center generally refers to a facility providing robust, scalable applications and storage services to individuals or other businesses. Exemplary implementations of hyperscale computing include cloud and big data storage, web service and social media platforms, enterprise data centers, and the like, which may consist of thousands of servers linked by an ultra-high speed fiber network.

According to an embodiment, units of the first and second HDDs manufactured as described in reference to FIG. 4 may be constituent to, e.g., assembled together or installed into, a data storage system such as DSS 500 (FIG. 5). Thus, a data storage system may comprise units of such sealed HDDs that are configured to operate at different RPMs and under different internal pressures, while utilizing a common slider which may have been optimized for one HDD design or the other.

Hence, according to an embodiment, a data storage system comprises a first HDD comprising a first head slider having a first ABS configuration, wherein the first HDD is sealed at a first internal pressure level and is configured to operate by rotating corresponding first disk media at a first RPM, and a second HDD comprising a second head slider having a second ABS configuration substantially the same as the first ABS configuration, where the second HDD is sealed at a second internal pressure level higher than the first internal pressure level and is configured to operate by rotating corresponding second disk media at a second RPM lower than the first RPM.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of manufacturing a plurality of hard disk drives, the method comprising:

assembling a first hard disk drive (HDD) comprising a first head slider having a first air bearing surface (ABS) configuration corresponding to a particular baseline fly height at a corresponding particular revolutions-per-minute (RPM);

configuring the first HDD to rotate corresponding first disk media at a particular first RPM at which, prior to assembly, components of the first HDD are configured to operate;

hermetically sealing the first HDD forming a substantially impermeable container having an internal pressure at a first pressure level configured and maintained therein;

assembling a second hard disk drive (HDD) comprising a second head slider having a second air bearing surface (ABS) configuration substantially the same as the first ABS configuration corresponding to the particular baseline fly height at the corresponding particular RPM;

configuring the second HDD to rotate corresponding second disk media at a particular second RPM at which, prior to assembly, components of the second HDD are configured to operate, wherein the second RPM is lower than the first RPM; and hermetically sealing the second HDD forming a substantially impermeable container having an internal pressure at a second pressure level configured and maintained therein that is higher than the first pressure level such that each of the first and the second head sliders operates substantially at the particular baseline fly height while operating at the different first and second RPMs.

2. The method of claim 1, wherein the second head slider is substantially the same as the first head slider.

3. The method of claim 1, wherein each of the first and second head sliders is formed according to a same fabrication process.

4. The method of claim 1, wherein each of the first and second HDDs is formed according to a same manufacturing process and configured with the same constituent components.

5. The method of claim 1, further comprising:

prior to hermetically sealing the first HDD, filling the first HDD with a first lighter-than-air gas; and prior to hermetically sealing the second HDD, filling the second HDD with a second lighter-than-air gas.

6. The method of claim 5, wherein each of the first and second lighter-than-air gases comprises helium.

7. The method of claim 1, wherein:

hermetically sealing the first HDD includes hermetically sealing the first HDD with a first lighter-than-air gas inside; and hermetically sealing the second HDD includes hermetically sealing the second HDD with a second lighter-than-air gas inside.

8. The method of claim 7, wherein each of the first and second lighter-than-air gases is composed of helium.

9. The method of claim 1, wherein:

assembling the second HDD includes, prior to hermetically sealing the second HDD with an internal pressure at the second pressure level, temporarily sealing the second HDD with an internal pressure at the first pressure level.

10. The method of claim 1, wherein:

configuring the first HDD to rotate corresponding first disk media at a first RPM comprises configuring the first HDD to rotate the corresponding first disk media at only the first RPM for data operations; and configuring the second HDD to rotate corresponding second disk media at a second RPM comprises configuring the second HDD to rotate the corresponding second disk media at only the second RPM for data operations.

11. A data storage system comprising:

a first hard disk drive (HDD) comprising a first head slider having a first air bearing surface (ABS) configuration corresponding to a particular baseline fly height at a corresponding particular revolutions-per-minute (RPM), wherein the first HDD is hermetically sealed to form a substantially impermeable container having a first internal pressure level maintained therein and is configured to operate by rotating corresponding first disk media at a particular first RPM at which, prior to assembly, components of the first HDD are configured to operate; and a second hard disk drive (HDD) comprising a second head slider having a second air bearing surface (ABS) configuration substantially the same as the first ABS configuration corresponding to the particular baseline fly height at the corresponding particular RPM, wherein the second HDD is hermetically sealed to form a substantially impermeable container having a second internal pressure level maintained therein higher than the first internal pressure level and is configured to operate by rotating corresponding second disk media at a particular second RPM at which, prior to assembly, components of the second HDD are configured to operate, wherein the second RPM is lower than the first RPM such that each of the first and the second head sliders operates substantially at the particular baseline fly height while operating at the different first and second RPMs.

12. The data storage system of claim 11, wherein:

the second head slider is substantially the same as the first head slider; and each of the first and second head sliders is formed according to a same fabrication process.

13. The data storage system of claim 11, wherein:

the first HDD is filled with a first lighter-than-air gas;

the first HDD is hermetically-sealed with the first lighter-than-air gas inside;

the second HDD is filled with a second lighter-than-air gas; and the second HDD is hermetically-sealed with the second lighter-than-air gas inside.

14. The data storage system of claim 13, wherein each of the first and second lighter-than-air gases comprises helium.

15. The data storage system of claim 13, wherein the first and second lighter-than-air gases are composed of different gases.

16. A method of manufacturing a plurality of hard disk drives, the method comprising:

assembling a first hard disk drive (HDD) comprising a first head slider having a first air bearing surface (ABS) configuration corresponding to a particular baseline fly height at a corresponding particular revolutions-per-minute (RPM);

configuring the first HDD with means for rotating corresponding first disk media at a particular first RPM at which, prior to assembly, components of the first HDD are configured to operate;

hermetically sealing the first HDD forming a substantially impermeable container having an internal pressure at a first pressure level configured and maintained therein;

assembling a second hard disk drive (HDD) comprising a second head slider having a second air bearing surface (ABS) configuration substantially the same as the first ABS configuration corresponding to the particular baseline fly height at the corresponding particular RPM;

configuring the second HDD with means for rotating corresponding second disk media at a particular second RPM at which, prior to assembly, components of the second HDD are configured to operate, wherein the second RPM is higher than the first RPM; and hermetically sealing the second HDD forming a substantially impermeable container having an internal pressure at a second pressure level configured and maintained therein that is lower than the first pressure level such that each of the first and the second head sliders operates substantially at the particular baseline fly height while operating at different RPMs.

17. The method of claim 16, wherein:

each of the first and second head sliders is formed according to a same fabrication process; and the second head slider is substantially the same as the first head slider.

18. The method of claim 16, further comprising:

prior to hermetically sealing the first HDD, filling the first HDD with a first lighter-than-air gas; and prior to hermetically sealing the second HDD, filling the second HDD with a second lighter-than-air gas;

wherein:

hermetically sealing the first HDD includes hermetically sealing the first HDD with the first lighter-than-air gas inside; and hermetically sealing the second HDD includes hermetically sealing the second HDD with the second lighter-than-air gas inside.

19. The method of claim 18, wherein each of the first and second lighter-than-air gases comprises helium.

20. The method of claim 16, wherein:

configuring the first HDD with means for rotating corresponding first disk media at a first RPM comprises configuring the first HDD to rotate the corresponding first disk media at only the first RPM for data operations; and configuring the second HDD with means for rotating corresponding second disk media at a second RPM comprises configuring the second HDD to rotate the corresponding second disk media at only the second RPM for data operations.

\* \* \* \* \*